United States Patent
Powers et al.

(10) Patent No.: US 11,521,063 B1
(45) Date of Patent: Dec. 6, 2022

(54) SYSTEM AND METHOD FOR TERMINAL ACQUISITION WITH A NEURAL NETWORK

(71) Applicant: BAE SYSTEMS INFORMATION AND ELECTRONIC SYSTEMS INTEGRATION INC., Nashua, NH (US)

(72) Inventors: Michael J Powers, Amherst, NH (US); Peter Simonson, Greenville, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 402 days.

(21) Appl. No.: 16/717,361

(22) Filed: Dec. 17, 2019

(51) Int. Cl.
*G06N 3/08* (2006.01)
*G06K 9/62* (2022.01)
(Continued)

(52) U.S. Cl.
CPC ............... *G06N 3/08* (2013.01); *G01D 5/30* (2013.01); *G01D 7/00* (2013.01); *G06F 17/16* (2013.01); *G06K 9/6256* (2013.01)

(58) Field of Classification Search
CPC . B64G 1/244; B64G 1/28; G01D 5/30; G01D 7/00; G01S 3/7867; G01S 5/0226; G01S 7/003; G02B 6/4225; G02B 23/165; G02B 27/0093; G06F 17/16; G06K 9/6256; G06N 3/006; G06N 3/04; G06N 3/0454; G06N 3/08; G06N 3/082; G06N 3/084;
(Continued)

(56) References Cited

U.S. PATENT DOCUMENTS 5,812,992 A * 9/1998 de Vries ............ G06N 3/082
706/15
5,953,146 A * 9/1999 Shelby ............... H04B 10/11
398/131
(Continued)

OTHER PUBLICATIONS

Mathworks, Inc., Multilayer Shallow Neural Networks and Backpropagation Training, Dec. 13, 2019, https://www.mathworks.com/help/deeplearning/ug/multilayer-neural-networks-and-backpropagation-training.html.
(Continued)

*Primary Examiner* — Gerald Gauthier
(74) *Attorney, Agent, or Firm* — Sand, Sebolt & Wernow LPA; Gary McFaline

(57) ABSTRACT

A system and method for reducing laser communication terminal pointing uncertainty. The method trains an artificial neural network (ANN) with input data characterizing terminal pointing error and dependent parameters. The method inputs the trained ANN a set of data of these dependent parameters with unknown pointing error. The method uses the ANN output to apply corrections to the terminal pointing solution to reduce pointing uncertainty. The method can condition the ANN generated corrections to avoid cases where application of the ANN correction could exceed the original pointing uncertainty. This conditioning includes computing the Euclidean distance between current ANN input parameter values and values in the ANN training dataset, and bounding the allowed magnitude of the ANN pointing correction. The method can train the ANN incrementally during terminal operation for real-time updates or train the ANN offline with gathered data and implement the trained ANN on the terminal for subsequent links.

17 Claims, 8 Drawing Sheets

(51) Int. Cl.
  *G01D 5/30* (2006.01)
  *G01D 7/00* (2006.01)
  *G06F 17/16* (2006.01)

(58) Field of Classification Search
  CPC ...... G06N 20/00; G06T 7/187; G06V 10/757; G06V 10/82; H01L 27/14621; H04B 10/11; H04B 10/118; H04W 4/027; A61B 5/0275; G01J 1/4204
  USPC .......... 342/367; 359/430; 382/201; 385/147; 398/122, 131; 701/13; 706/15, 20, 21, 706/25
  See application file for complete search history.

(56) References Cited

U.S. PATENT DOCUMENTS

| | | | | |
|---|---|---|---|---|
| 6,195,044 | B1* | 2/2001 | Fowell | B64G 1/28 |
| | | | | 398/9 |
| 6,269,351 | B1* | 7/2001 | Black | G06N 3/082 |
| | | | | 706/14 |
| 6,289,268 | B1* | 9/2001 | Didinsky | B64G 1/244 |
| | | | | 701/13 |
| 7,236,680 | B1* | 6/2007 | Jordan | G02B 6/4225 |
| | | | | 385/52 |
| 7,496,546 | B2* | 2/2009 | Hoya | G06N 3/04 |
| | | | | 706/26 |
| 8,401,307 | B1* | 3/2013 | Rowe | G06V 10/757 |
| | | | | 359/399 |
| 10,158,427 | B2* | 12/2018 | Carlson | G01C 21/025 |
| 10,795,453 | B2 | 10/2020 | Powers | |
| 2009/0324236 | A1* | 12/2009 | Wu | H04B 10/118 |
| | | | | 398/122 |
| 2012/0030154 | A1* | 2/2012 | Nicholson | G01S 7/003 |
| | | | | 703/2 |
| 2013/0265639 | A1* | 10/2013 | Batchvarov | G02B 23/165 |
| | | | | 359/429 |
| 2015/0262060 | A1* | 9/2015 | Husain | G06N 3/08 |
| | | | | 706/21 |
| 2017/0004399 | A1* | 1/2017 | Kasahara | G06N 3/0454 |
| 2017/0124450 | A1* | 5/2017 | Hara | G06N 20/00 |
| 2019/0012594 | A1* | 1/2019 | Fukuda | G06N 3/0454 |
| 2019/0087723 | A1* | 3/2019 | Cho | G06F 9/46 |
| 2019/0205745 | A1* | 7/2019 | Sridharan | G06N 3/08 |
| 2019/0384047 | A1* | 12/2019 | Johnson | A61B 5/0275 |
| 2019/0384058 | A1* | 12/2019 | Gullicksen | G01S 5/0226 |
| 2020/0034714 | A1* | 1/2020 | Bae | G06V 10/82 |
| 2020/0116558 | A1* | 4/2020 | Pacala | G01J 1/4204 |
| 2020/0120233 | A1* | 4/2020 | Annunziata | G06V 10/82 |
| 2020/0342308 | A1* | 10/2020 | Werner | G06N 20/20 |
| 2020/0371481 | A1* | 11/2020 | Chen | G06N 3/006 |
| 2021/0051625 | A1* | 2/2021 | Siddiqui | H04W 4/027 |

OTHER PUBLICATIONS

Mathworks, Inc., Multilayer Shallow Neural Network Architecture; Dec. 13, 2019 https://www.mathworks.com/help/deeplearning/ug/multilayer-neural-network-architecture.html.
Mathworks, Inc., Train and Apply Multilayer Shallow Neural Networks, Dec. 13, 2019 https://www.mathworks.com/help/deeplearning/ug/train-and-apply-multilayer-neural-networks.html.

* cited by examiner

SYSTEM AND METHOD FOR TERMINAL ACQUISITION WITH A NEURAL NETWORK

TECHNICAL FIELD

The present disclosure relates to an acquisition system using a trained neural network to reduce the acquisition time therebetween. More particularly, the neural network is trained and utilized to reduce pointing errors between two terminals by correcting the pointing errors based on previous training and machine learning.

BACKGROUND

Laser communication Pointing Acquisition and Tracking (PAT) has three phases: "pointing" where each terminal attempts to point at the other, "acquisition" where the terminals see each other and center up their pointing, and "tracking" once the terminals establish the link. An "open-loop" pointing vector to the remote terminal is calculated using information such as both terminal's GPS locations and the local terminal's attitude (i.e. roll, pitch, and yaw relative to the local level frame of reference). The local terminal then determines how to orient its pointing system (e.g. gimbal mirrors) to point its sensors along that vector. Errors in the open-loop vector and pointing system orientation typically require the terminals to perform an uncertainty area scan to establish the link, which can take seconds to minutes.

Take for example a lasercom system with a beam divergence half angle of 0.01 degrees and pointing uncertainty of +/−1 degrees. Using the small angle approximation for solid angle area ($\Omega=\pi\theta^2$), the ratio of the solid angle for the beam and the pointing uncertainty is 10,000. In order to illuminate the remote terminal the local terminal searches the uncertainty area with its small beam. If in this example the searching terminal were required to give the remote terminal 0.1 seconds to respond, searching the entire uncertainty area would take on order of 1000 seconds.

In addition to the initial acquisition to establish a link, lasercom terminal links often have to operate in conditions with frequent outages driven by causes such as blockages from clouds, exceedance of terminal field of regard, high shock environment, high channel fading, etc. These blockage events can last milliseconds to many minutes with frequent re-occurrence causing repeated regression of the terminal's PAT state machine. While the cause of these outages maybe unavoidable, the resultant downtime before recovery of the link is of critical import.

In order to minimize the acquisition timeline then, the system designer minimizes the pointing uncertainty, maximize the beam divergence, and/or maximize the speed of the search scan. The beam divergence for a lasercom system is proportional to the wavelength divided by the aperture diameter. Minimizing beam divergence generally maximizes communication link performance. A wider beam divergence for acquisition purposes helps to a point, but the wider beam results in a lower power density on the remote terminal making detection more challenging. The maximum speed of the search scan is often limited by the response times of the remote terminal to both acquire the illumination and point a response laser beam back. The pointing uncertainty therefore is a key free parameter that the system designer attempts to minimize. Since the acquisition time is proportional to the square of the pointing uncertainty, any reduction in pointing uncertainty yields significant benefit to the system user.

Most commonly, the method for controlling pointing uncertainty is precise terminal pointing calibration during manufacturing. This generally involves gathering a large set of pointing data over the terminal's field of regard and determining a best-fit calibration parameter set or look-up tables with interpolation for use in the field. This is very time consuming and still results in limited accuracy due to inherent differences between the conditions for lab calibration and the field operational environment.

Techniques for improvement of re-acquisition times based on most recent pointing error observations, just prior to link outage have limited value when the outage times are long enough to invalidate the calculated correction due to changes in relative terminal position, attitudes, or other pointing correlated variables. Star tracking with a laser communication system (U.S. Pat. No. 10,158,427) is another method to reduce pointing uncertainty using a lasercom terminal optical design sensitive enough to detect stars and an operational environment compatible with observing the sky. Another, similar method has overcome the optical sensitivity limitations by using the sun as the pointing reference (U.S. patent application Ser. No. 16/047,072). In this disclosure, we describe a technique for reducing pointing error with broad application to any lasercom terminal architecture and capable of running both offline and on-line for real-time adaptation.

SUMMARY

In accordance with one aspect, an exemplary embodiment of the present disclosure is a computer implemented method for reducing laser communication terminal pointing uncertainty, comprising: Training a computer implemented artificial neural network (ANN) with input data characterizing the terminal pointing error and dependent parameters; inputting to the trained ANN a set of data of these dependent parameters with unknown pointing error; and using the ANN output to apply corrections to the terminal pointing solution to reduce the pointing uncertainty; conditioning the ANN generated corrections to avoid cases where application of the ANN correction could exceed the original pointing uncertainty. In this exemplary embodiment conditioning includes: computing the Euclidean distance between the current ANN input parameter values to the values in the ANN training dataset; bounding the allowed magnitude of the ANN pointing correction; training the ANN incrementally during terminal operation for real-time updates; and training the ANN offline with gathered data and implementing the trained ANN on the terminal for subsequent links.

In accordance with an exemplary aspect of the present disclosure there is an ANN algorithm to reduce pointing errors for laser communication terminals. In one example, the ANN used was a single hidden layer perceptron with ten neurons. Using both simulated terminal data and actual hardware test data the algorithm results show a >10× improvement is possible. Additionally features of the present disclosure may add one or more script to predict acquisition timeline and probability metrics in addition to pointing error magnitudes which are more important to end users. Further, the system can optimize the ANN real-time algorithm learning increments, correction conditioning, and test against more datasets, and utilize actual flight test datasets for evaluation and optimization of algorithm performance, and provide deployable neural network code for training and ANN implementation in real-time system hardware.

In one aspect, an exemplary embodiment of the present disclosure may provide a computer implemented method for reducing laser communication terminal pointing uncertainty. The method trains a computer implemented artificial neural network (ANN) with input data characterizing the terminal pointing error and dependent parameters. The method inputs the trained ANN a set of data of these dependent parameters with unknown pointing error. The method uses the ANN output to apply corrections to the terminal pointing solution to reduce the pointing uncertainty. The method can condition the ANN generated corrections to avoid cases where application of the ANN correction could exceed the original pointing uncertainty. This conditioning includes computing the Euclidean distance between the current ANN input parameter values to the values in the ANN training dataset, and bounding the allowed magnitude of the ANN pointing correction. Additionally, the method can train the ANN incrementally during terminal operation for real-time updates or train the ANN offline with gathered data and implementing the trained ANN on the terminal for subsequent links.

In another aspect, an exemplary embodiment of the present disclosure may provide a method comprising: training an artificial neural network (ANN) with training data characterizing pointing error between a first terminal and a second terminal remote from the first terminal, and the input data including dependent parameters, wherein completion of the training provides a trained ANN; inputting first terminal data with dependent data having an unknown pointing error to the trained ANN; correcting the first terminal data with the trained ANN to reduce pointing uncertainty between the first terminal and the second terminal; and pointing the first terminal at the second terminal based on corrections to pointing error between the first and second terminals performed by the trained ANN. This exemplary embodiment or another exemplary embodiment may further provide wherein correcting the first terminal data with the trained ANN includes: computing a distance between a first input parameter within the first terminal data and an input parameter within the training data. This exemplary embodiment or another exemplary embodiment may further provide wherein the distance that is computed is a Euclidean distances. This exemplary embodiment or another exemplary embodiment may further provide determining whether the distance that is computed is within a predetermined bound; wherein if the distance is within the predetermined bound, then correcting the first input parameter, and if the distance is outside the predetermined bound, then no correction of the first input parameter occurs. This exemplary embodiment or another exemplary embodiment may further provide wherein the first input parameter is a gimbal angle of the first terminal, further comprising: bounding a predetermined range for gimbal angles between the first terminal and the second terminal; computing a Euclidean distance between the gimbal angle at the first terminal and a training gimbal angle of the training data; and correcting the gimbal angle of the first terminal relative to the second terminal when the gimbal angle of the first terminal is within the predetermined bound, and if the gimbal angle of the first terminal is outside the predetermined bound, then no correction occurs.

This exemplary embodiment or another exemplary embodiment may further provide weighting an application of a correction of the first terminal data based on the distance between the between the first input parameter within the first terminal data and the input parameter within the training data, wherein smaller distances between the first input parameter within the first terminal data and an input parameter within the training data are weighted more than greater distances between the first input parameter within the first terminal data and the input parameter within the training data. This exemplary embodiment or another exemplary embodiment may further provide weighting the Euclidean distance between the first input parameter within the first terminal data and the input parameter within the training data. This exemplary embodiment or another exemplary embodiment may further provide bounding a maximum magnitude of a permitted ANN correction prior to weighting the application of the correction. This exemplary embodiment or another exemplary embodiment may further provide wherein the maximum magnitude of the distance between the first input parameter within the first terminal data and the input parameter within the training data for the permitted ANN correction is less than one degree. This exemplary embodiment or another exemplary embodiment may further provide weighting corrections having the distance between the first input parameter within the first terminal data and the input parameter within the training data closer to zero degrees more than corrections having the distance between the first input parameter within the first terminal data and the input parameter within the training data closer to one degree. This exemplary embodiment or another exemplary embodiment may further provide receiving signal data from the second terminal in the first terminal; and calculating a perceived vector between the first terminal and the second terminal, wherein the perceived vector is part of the first terminal data that is corrected with the trained ANN; wherein the distance to be computed is the distance between the perceived vector and a training vector within the training data. This exemplary embodiment or another exemplary embodiment may further provide wherein receiving signal data from the second terminal in the first terminal is accomplished by: acquiring signal data from the second terminal; and tracking the second terminal relative to the first terminal. This exemplary embodiment or another exemplary embodiment may further provide assessing a pointing error by comparing the perceived vector with an open-loop pointing vector between the first terminal and the second terminal. This exemplary embodiment or another exemplary embodiment may further provide computing the perceived vector from the first terminal to the second terminal based, at least in part, on a position of a beam steering mirror in the first terminal. This exemplary embodiment or another exemplary embodiment may further provide computing a gimbal vector based, at least in part, on gimbal angles associated with the beam steering mirror in the first terminal; and rotating the gimbal vector into a reference frame using a transpose of a direction cosine matrix of the first terminal. This exemplary embodiment or another exemplary embodiment may further provide inputting first terminal data with dependent data having an unknown pointing error to the trained ANN is accomplished by: inputting open-loop vector data from the first terminal and gimbal angles of the first terminal into the trained ANN.

In yet another aspect, an exemplary embodiment of the present disclosure may provide a non-transitory computer readable storage medium having instructions encoded thereon that, when executed by one or more processor, implements operations to correct pointing errors between two terminals, the instructions to implement the operations comprising: train an artificial neural network (ANN) with training data characterizing pointing error between a first terminal and a second terminal remote from the first terminal, and the input data including dependent parameters, wherein completion of the training provides a trained ANN; input first terminal data with dependent data having an unknown pointing error to the trained ANN; correct the first terminal data with the trained ANN to reduce pointing uncertainty between the first terminal and the second terminal; and point the first terminal at the second terminal based on the correcting performed by the trained ANN.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1A:
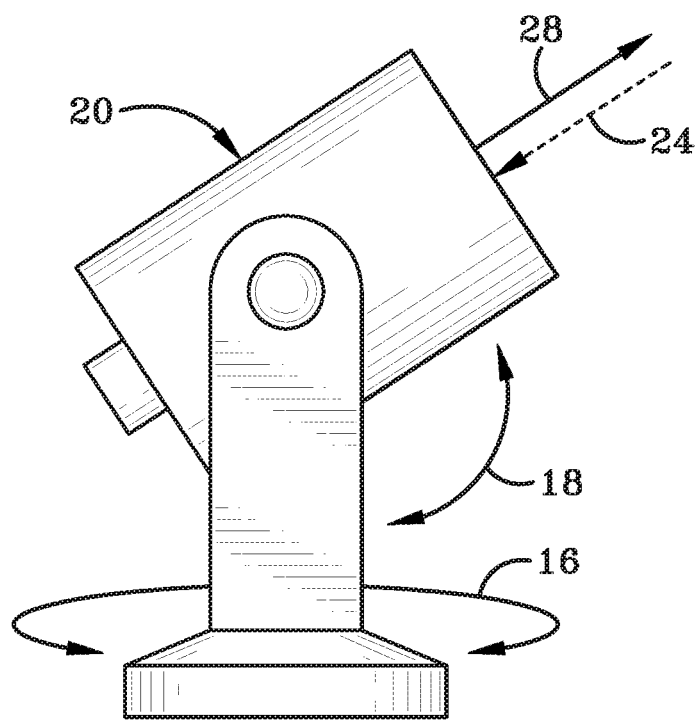
FIG. 1A is a diagrammatic view of an exemplary terminal in accordance with the present disclosure.
Figure 1B:
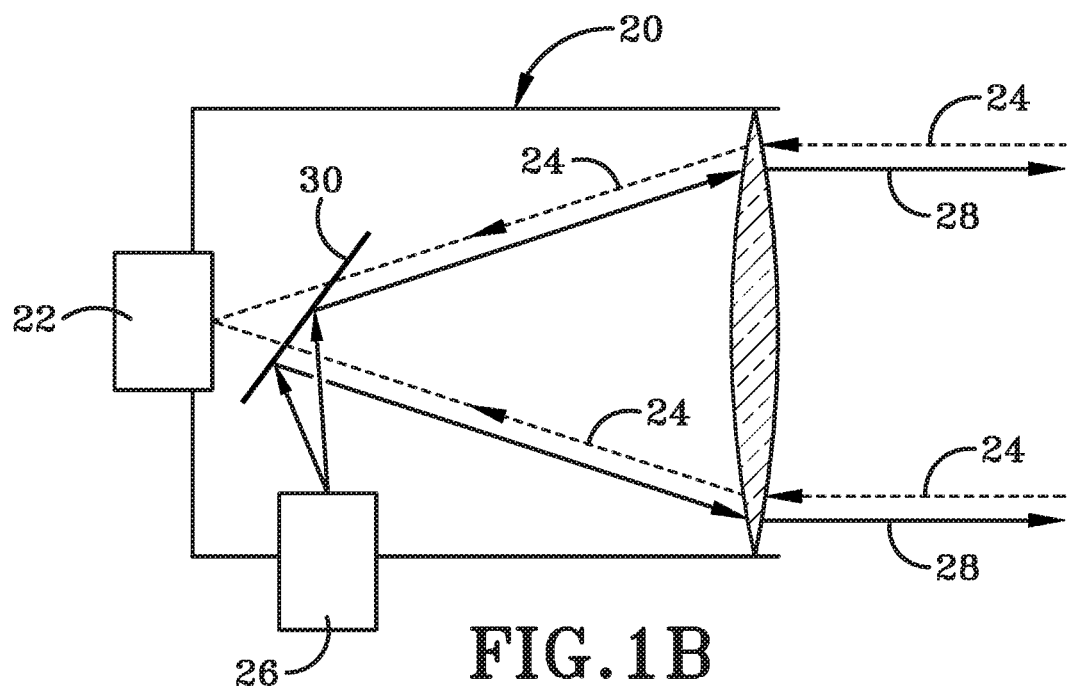
FIG. 1B is a diagrammatic view of an exemplary transmitter and receiver within the terminal.
Figure 2:
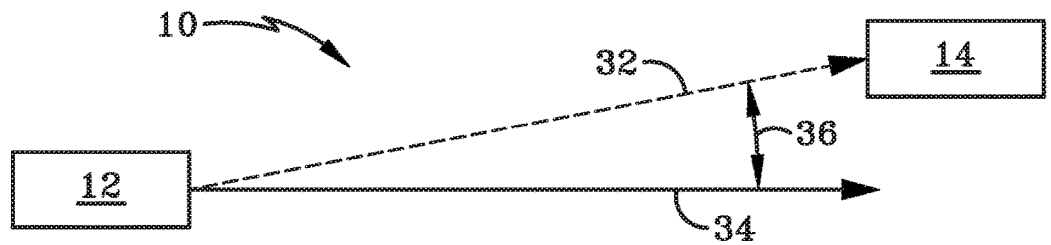
FIG. 2 is a schematic view of two exemplary terminals with an open loop pointing vector and a perceived vector between the two terminals.

FIG. 1A through FIG. 2 depict aspects of an exemplary system of the present disclosure generally at 10. System 10 includes a first terminal 12 and a remote second terminal 14. The first terminal 12 is configured to point to the second terminal 14, acquire the second terminal 14, and track the second terminal 14. In one particular embodiment, the first terminal 12 and the second terminal 14 are laser communication (lasercom) terminals. The first and second terminals may be mounted on respective platforms that may be stationary or mobile, manned or unmanned.

FIG. 1A and FIG. 1B depicts an exemplar lasercom first terminal 12 and the second terminal 14 with a two-axis azimuth and elevation pointing gimbal. The azimuth gimbal enables to the first terminal to move relative to a gimbal azimuth angle 16. The elevation gimbal enables the first terminal 12 to move relative to a gimbal elevation angle 18. On the gimbal is mounted a telescope 20 with a sensor 22 for a receive signal 24 and a laser 26 to generate a transmit signal 28. An optical beam splitter 30 couples the optical paths for transmit and receive signals 24, 28.

FIG. 2 depicts that establishing a communication link between the two terminals 12, 14, initially each terminal "points" to the other, then "acquires" the other terminals signal, and finally "tracks" the other terminal to maintain the link, otherwise known as the "PAT" sequence. After acquisition, during tracking with the sensor 22 of the first terminal 12, the first terminal 12 can calculate a "perceived" vector to the remote terminal. This calculation uses terminal data such as the measured position of the received beam signal 24 on the tracking sensor 22 on the first terminal 12, gimbal mirror positions, and terminal attitude. System 10 compares this perceived vector 32 to the "open loop" pointing vector 34 to assess the pointing error 36, which is the difference between open loop pointing vector 34 and the perceived vector 32.

FIG. 2 identifies a notional PAT sequence in terms of these vectors for a 2-axis gimbal (azimuth & elevation) terminal pointing system. In the equations, the functions called ned2aer and aer2ned, commonly available as math functions, convert local Cartesian north/east/down (NED) to local spherical azimuth/elevation/range (AER) respectively.

For pointing, the first terminal 12 computes open loop pointing vector 34 to second terminal 14 based on knowledge of each terminal's location (i.e. latitude, longitude, altitude or x, y, z Cartesian coordinates of the two terminal vectors). The North East Down (NED) vector between the terminals based on x, y, z coordinates in a local level reference frame is: NEDvector$_{OL}$=Terminal 14$_{xyz}$-Terminal 12$_{xyz}$-During pointing, Terminal 12 points along this vector by orienting its beam steering gimbal, taking into account the terminal's attitude. For a simple 2-axis Azimuth & Elevation gimbal pointer: (1) Gimbalvector$_{OL}$=DCM*NEDvector$_{OL}$ % Rotate the open loop NED vector 34 to second terminal 14 into first terminal's 12 gimbal frame of reference by multiplying the vector by the direction cosine matrix (DCM) for first terminal's 12 attitude (i.e. roll, pitch, yaw); and (2) Gimbalangles$_{OL}$=ned2aer(Gimbalvector$_{OL}$) % compute first terminal's 12 open loop gimbal Azimuth and Elevation angles 16,18 to point along that vector.

For acquiring and during acquisition, first terminal 12 sees second terminal 14 in a slightly different position on its acquisition and tracking sensor (due to pointing error 36) and adjusts its closed loop beam steering gimbal position to center second terminal 14 on the sensor 22 of the first terminal 12. (1) Gimbalangles$_{CL}$=Gimbalangles$_{OL}$+closed loop sensor correction % first terminal's 12 gimbal angles to keep second terminal 14 centered on its sensor 22.

For tracking, while tracking second terminal 14 on its sensor 22, first terminal 12 computes the perceived vector 32 to second terminal 14 based on measuring where its beam steering mirror positions (i.e. Azimuth and Elevation). NEDvector$_{perceived}$=DCM$^T$*aer2ned(Gimbalangles$_{CL}$) % Compute the gimbal vector based on gimbal angles and rotate into the NED frame (using the transpose of the terminal's 12 DCM) to get the perceived NED vector to second terminal 14. The difference between the open loop vector 34 and perceived vectors 32 is first terminal's 12's pointing error 36. While tracking, first terminal 12 can compute these vectors continuously to assess its pointing error. There error is identified as PointingError=NEDvector$_{perceived}$-NEDvector$_{OL}$.

In one particular embodiment, an exemplary operation the present disclosure shown in FIG. 2 provides for two terminals 12, 14 at some distance away from each other and which need to acquire signals from each other. In the acquisition process, each terminal is given some information about how to find the other terminal. Typically, it is a manifestation of some information that the terminal is given relative to a geographic location or an attitude of the platform or terminal. Using this information, the terminals may obtain a point vector that points toward the other terminal. Then, when the pointing is accomplished, there is usually a calibration that is performed by a manufacturer of the terminal, which may depend on the design of the terminal, for how the terminal should position various mirror or gimbals or gimbaled angles to achieve a desired vector. The vector is calculated based on the location of the terminal, then it will point the vector based on the location as well as calibration measurements that may need adjusted, then this will result in finding the other terminal. Once the terminals 12, 14 acquire each other, the terminal can, during a link session, calculate another vector, which is referred to as the perceived vector 32. First vector 34 that is calculated at the beginning is performed when the acquisition establishes the direction at which the first terminal needs to point to acquire the second terminal. Then during the link session, once the link is acquired, the first terminal is able to determine that the second terminal may be slightly off, or slightly out of position relative to the initial vector to obtain the perceived vector as to where the second terminal is actually located. The perceived vector 32 establishes an error between the perceived vector and the original first pointing vector.

As one having ordinary skill in the art understands, the pointing vectors referred to herein typically include three numbers, a reference to a north east down (NED) reference frame. Alternatively, an east north up (ENU), reference frame may be used.

Based on the knowledge of the location of the first terminal 12 and how it is oriented, or its attitude, and the general knowledge of the general position of the second terminal (the attitude is relative to the local reference frame), this then calculates the north east down vector to the other terminal. Then, the mirrors in the first terminal 12 may be positioned to point along that vector. In accordance with another example of the present disclosure, an example provides a two-axis gimbal that has an Azimuth and Elevation. The system calculates what the Azimuth and Elevation angle should be to point along the pointing vector. This requires a conversion from NED coordinates to Azimuth and Elevation angles.

During tracking, the first terminal is able to see the second terminal at a slightly different position based on movement of the two or one of the terminals. The sensor may then position its Azimuth and Elevation gimbal angles slightly differently to center the second terminal to ensure that the link is strong. This is more precise than a traditional open loop calculation. Additionally, this type of calculation may be performed in reverse based on knowledge of the actual Azimuth and Elevation angles that are used to track the other terminal. Thus, when used in reverse, the first terminal may identify that it is pointing along a perceived vector, which is slightly different than the open loop pointing vector that the first terminal originally started with. The system is able to determine the difference between the open loop first vector and the second perceived vector to establish the error in the system.

As the link runs, the system continuously calculates both vectors. Namely, the system may calculate only the first vector which is established by knowledge of the first terminal relative to the second terminal based on the attitude of the first terminal. However, the system may independently calculate the perceived vector of the pointing vector between the first terminal and the second terminal during a tracking link. Then, the error between the two may continuously be evaluated and stored. In other particular embodiments, calculation does not need to be done continuously, rather, it may be performed over intervals. However, the number of intervals should be sufficient to cover many different variables that could be encountered. For example, if the error was dependent on the Azimuth angle, but the Azimuth angle is not changing much, then the data could be collected in sporadic intervals. However, if the variable requires that there are many Azimuth angles changing frequently, then the interval collection may occur more frequently or in shorter intervals. Some other exemplary variables that the system may utilize include the gimbal angle of Azimuth and Elevation, as well as the attitude of the terminal, such as roll angle, pitch angles, or yaw angles. Additionally, some other variables include the vector itself. For example, there may be dependence on the vector being a variable if the vector is pointing towards a terminal that is straight above the first terminal and another terminal that is directly horizontal to the first terminal. In these situations, there may be some error that is dependent on how much of the atmosphere the vectors are moving through or the angle through the atmosphere dependent on the vector itself. Additionally, there may be some non-intuitive variable dependencies, for example, the temperature of the system, which may cause the pointing to vary. As such, as devices within the system warm up or cool down, there may be errors in the pointing mechanisms that cause the pointing vector to change. There may be some other variable dependencies on other environmental factors or factors of the terminal, such as acceleration or altitude or pressure. Thus, these variables could also be used as inputs to train the system of the present disclosure.

Figure 3A:
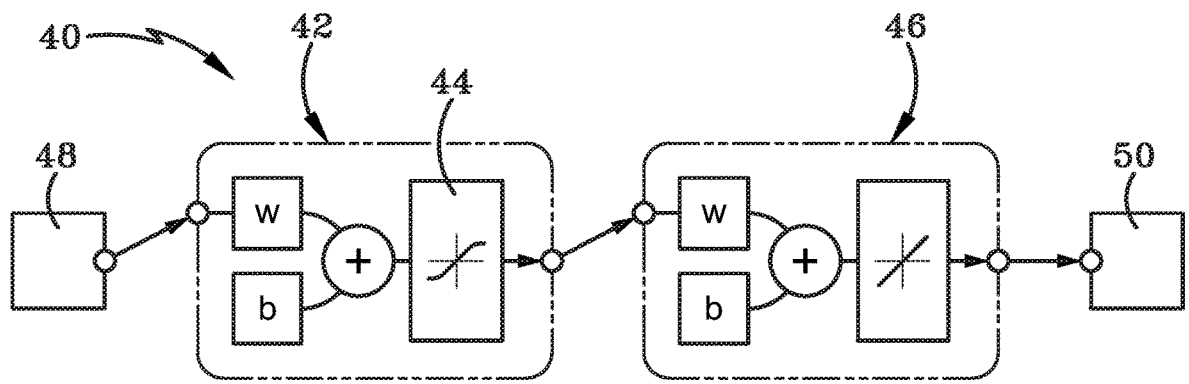
FIG. 3A is a schematic view of an exemplary neural network in accordance with an exemplary aspect of the present disclosure.

FIG. 3A depicts an exemplary artificial neural network (ANN) 40 that is used in conjunction with system 10. ANNs are biologically inspired computational networks that represent a family of models effective at solving problems of function approximation, pattern recognition, classification, and clustering. The ANNs are based on a supervised procedure and generally comprise three layers: input, hidden, and output. The ANN is composed of multiple simple computational blocks of artificial neurons. An artificial neuron has a body in which computations are performed, and a number of input channels and one output channel. The neuron receives an input signal and then computes an output on it employing a weight and a bias. The neuron also has a transfer or activation function such as sigmoid, hyperbolic tangent, binary and linear.

The ANN 40 in one example is a feedforward neural network and in one example has one hidden layer 42 and ten neurons 44. The transfer function for the hidden layers is 'tansig' (hyperbolic tangent sigmoid) and the transfer function for the output layer 46 is 'purelin' (linear). In one exemplary embodiment, there are five input parameters 48: the NED vector 34 (North, East, Down values), the Azimuth gimbal angle 16, and the Elevation gimbal angle 18. The training target is the difference between the open loop NED vector and the perceived NED vector (three values for North, East, and Down errors). The output of the trained network is the open loop NED vector correction (three values for North, East, and Down corrections). In one example the network training updates the weight and bias values according to the Levenberg-Marquardt backpropagation optimization method.

Figure 3B:
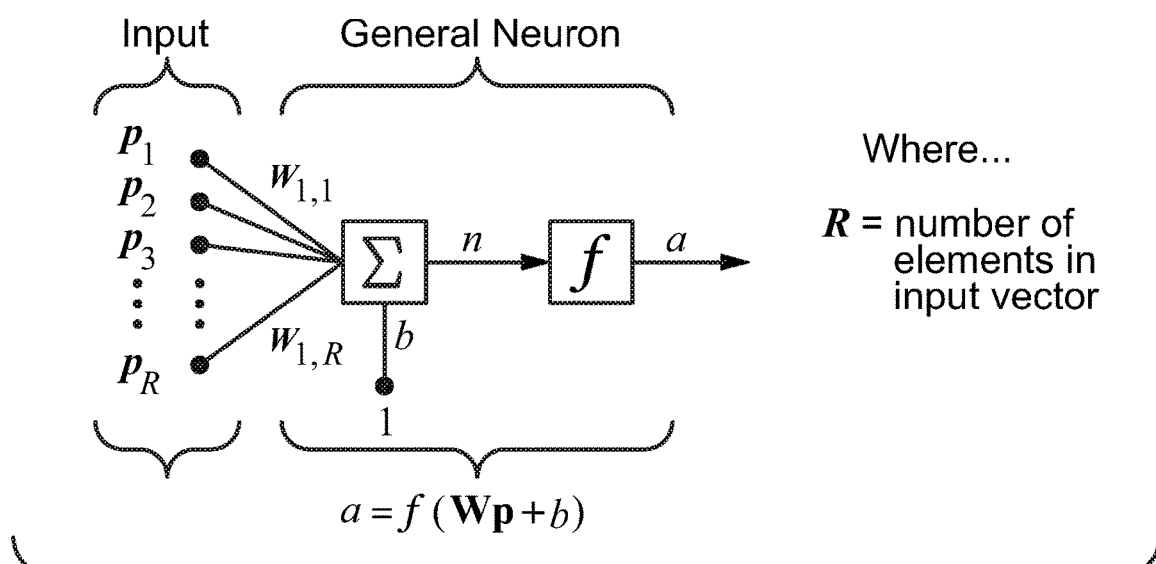
FIG. 3B is a diagrammatic view of an exemplary neuron model with a transfer function.
Figure 3C:
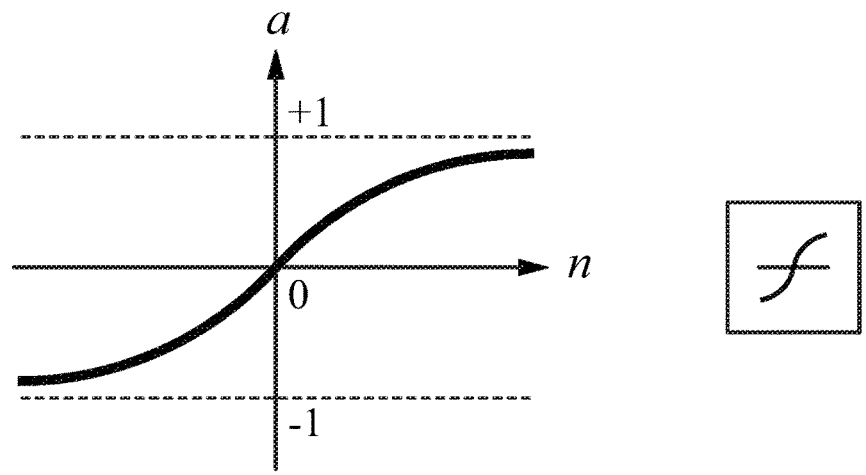
FIG. 3C is a diagrammatic view of an exemplary tansig function.
Figure 3D:
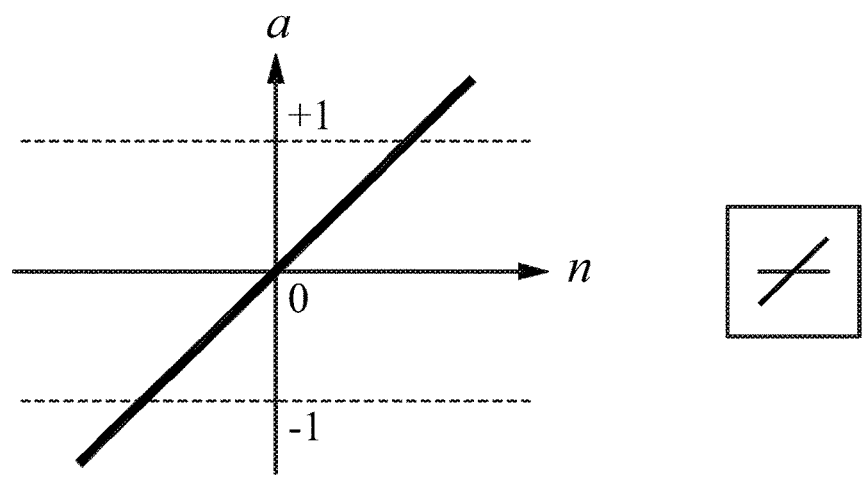
FIG. 3D is a diagrammatic view of an exemplary linear transfer function.

FIG. 3B depicts a description of a neuron model. An elementary neuron with R inputs is shown. Each input is weighted with an appropriate weight. The sum of the weighted inputs p and the bias forms the input to the transfer function f. Neurons can use any differentiable transfer function f to generate their output. In this example the tansig function shown in FIG. 3C for neurons in the hidden layer is used. For the neuron in the output layer a linear transfer function shown in FIG. 3D is used.

Figure 3E:
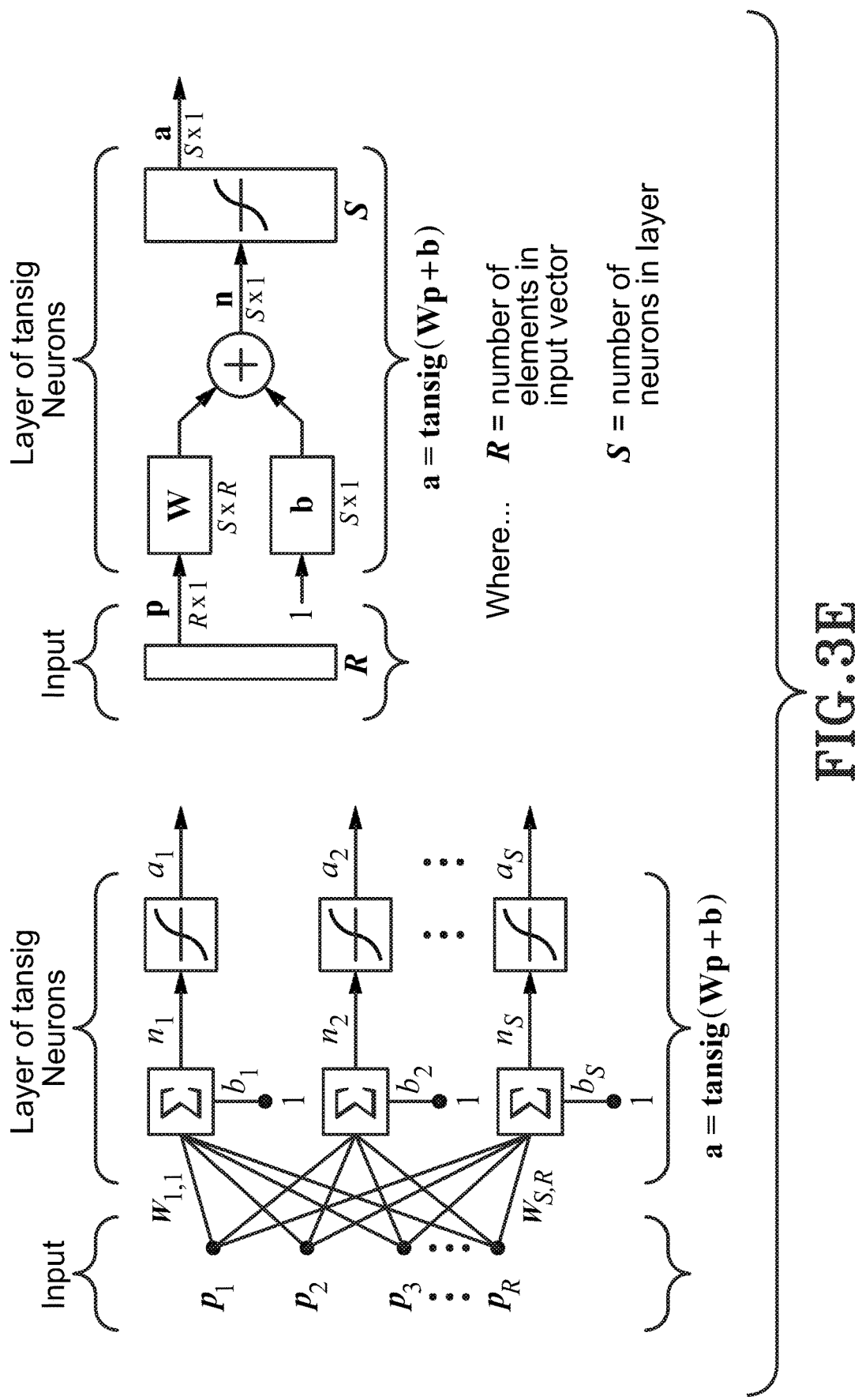
FIG. 3E is a diagrammatic view of an exemplary model for a tansig function.

FIG. 3E depicts a single-layer network of S tansig neurons having R inputs is shown in full detail on the left and with a layer diagram on the right. Namely, the left and right side of FIG. 3E depicts the same thing, just different representations. They both are showing details of FIG. 3A, namely input parameters 48 and hidden layer 42.

In accordance with the present disclosure ANN 40 has one hidden layer of ten sigmoid neurons followed by an output layer of linear neurons. This configuration was found to be a reasonable compromise between computation complexity and accuracy of the ANN performance. Multiple layers of neurons with nonlinear transfer functions allow the network to learn nonlinear relationships between input and output vectors. For multiple-layer ANNs 40 the layer number determines the superscript on the weight matrix. The appropriate notation is used in the two-layer tansig/purelin network shown in FIG. 3F.

Figure 3F:
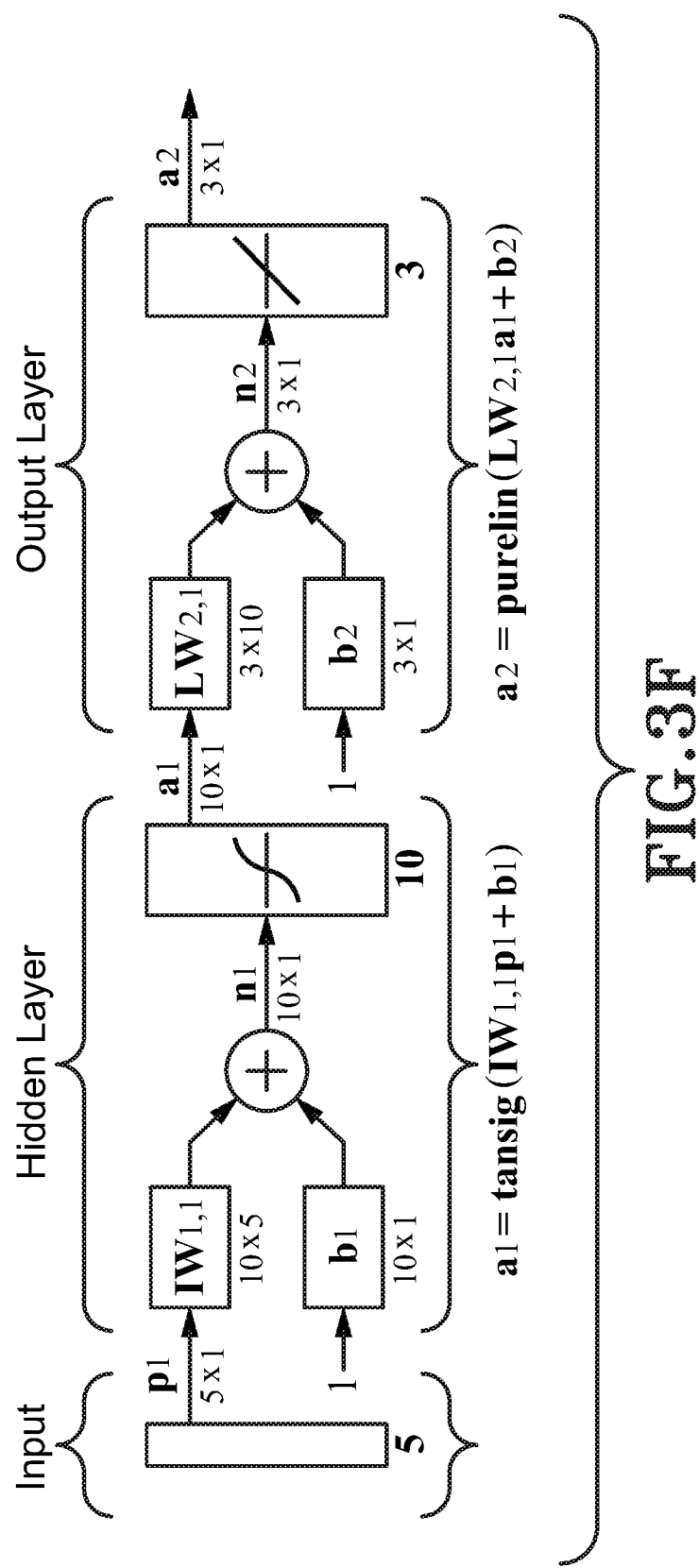
FIG. 3F is a diagrammatic view of an exemplary two-layer tansig/pure linear network.

This network of FIG. 3F can be used as a general function approximator. It can approximate any function with a finite number of discontinuities arbitrarily well, given sufficient neurons in the hidden layer. Alternative ANN designs with additional hidden layers and with more or less neurons per layer are also valid cases. Larger numbers of neurons in the hidden layer give the network more flexibility because the network has more parameters it can optimize. The optimal design being based on factors such as the complexity of the underlying function and available computing resources related to the particular systems' design and pointing error behavior.

Figure 3G:
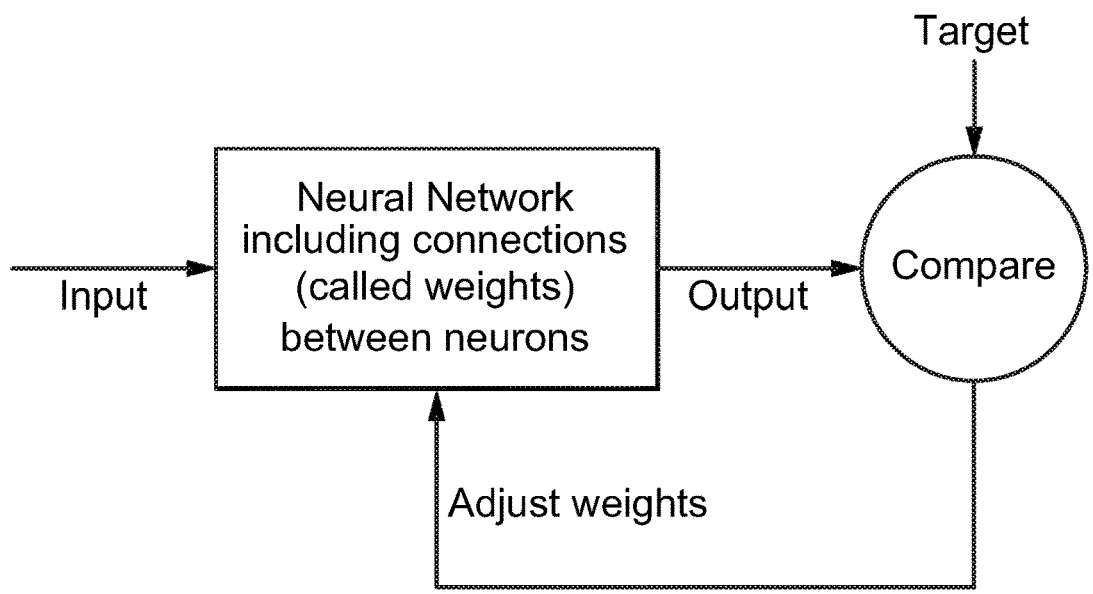
FIG. 3G is a flowchart depicting a training iterative process.

With the ANN 40 design defined, the weights and bias values are given some initial values, these values can be arbitrary or predefined based on past history to improve the speed of solution convergence during training. When the network weights and biases are initialized, the network is ready for training for function approximation (nonlinear regression). The training process requires a set of examples of proper network behavior-network inputs and target outputs. The process of training a neural network involves tuning the values of the weights and biases of the network to optimize network performance. The performance function used here is mean square error, the average squared error between the network outputs and the target outputs as shown in FIG. 3G. FIG. 3G depicts training iterative process, inputs for our example are: five input parameters 48: the NED vector 34 (North, East, Down values), the Azimuth gimbal angle 16, and the Elevation gimbal angle 18.

For training multilayer feedforward networks, any standard numerical optimization algorithm can be used to optimize the performance function, but there are a few key ones that have shown excellent performance for neural network training. These optimization methods use either the gradient of the network performance with respect to the network weights, or the Jacobian of the network errors with respect to the weights.

The gradient and the Jacobian are calculated using a technique called the backpropagation algorithm, which involves performing computations backward through the network. The backpropagation computation is derived using the chain rule of calculus and is described in Chapters 11 (for the gradient) and 12 (for the Jacobian) of "Hagan, M. T., H. B. Demuth, and M. H. Beale, Neural Network Design, Boston, Mass.: PWS Publishing, 1996". In one example the network training updates the weight and bias values according to the Levenberg-Marquardt backpropagation optimization method, also described starting on page 12-19 of the Hagan et. al which are entirely incorporated by reference. On each iteration of the training process, as the network weights and bias values are updated, the mean squared error is calculated. Training typically stops when the error meets a desired threshold of performance for the specific application. Training can also be stopped based on the number of iterations, processing time, or performance gradient values.

Once the network is trained, a validation test maybe performed using a subset of the previously gathered input data that is reserved for validation purposes with known target outputs. This validation tests the network against available data that was not used during training to confirm the network performance before using it operationally. The validation test error limits are established based on the particular terminal application tolerances. After the network is trained and validated, the network object can be used to calculate the network response to any input.

The multi-layer perceptron ANN 40 with just one hidden layer 42 can approximate any continuous function. As pointing errors in a laser communication terminal are a continuous function, and the ANN algorithm can minimize these pointing errors 36. ANN 40 can be trained off-line using training data gathered during a communication link and then be utilized to correct pointing errors 36 in subsequent link sessions. The ANN 40 can also be trained real-time during link operation and allow for near instantaneous re-acquisition of the link when outages occur. Retention of the trained ANN 40 in a computer readable memory allows for use and updates in subsequent link sessions.

The ANN 40 is trained with the pointing error 36 (the difference between the open loop and perceived vectors 34, 32) as the target output while the link is up. Then if the link goes down, the terminal can used the trained network to provide pointing corrections during a future acquisition to initiate a link. In some examples, the inputs 48 for training the ANN 40 are the open loop vector 34, and terminal gimbal angles 16, 18 (Azimuth and Elevation), and the training target for the ANN output is the pointing error 36. The trained ANN 40, using just the open loop vector and terminal gimbal angles as inputs, computes an open loop vector 34 correction for subsequent acquisitions. An exemplary advantage of ANN 40 is that no prior understanding of the pointing error 36 underlying function behavior is necessary; it just needs the input parameters that the output 50 is dependent on and a sufficient set of training data. If for example, in addition to gimbal angles 16, 18, one believes the pointing error 36 to be an unknown function of temperature, the temperature can also be input during ANN 40 training and operation to allow compensation for that factor. Terminal attitude (i.e. roll, pitch, yaw relative to the local level frame), altitude, temperatures of multiple components, accelerations, air pressure are all examples of other potential input parameters that pointing error 36 maybe dependent on.

In operation and with reference to FIG. 3A, according to one example five inputs 48 are input into the neural network 40. The five inputs are comprised of three input values associated with the north east down vector (NED vector), a number associated with the Azimuth angle, and a number associated with the Elevation angle. A database of these five values that is constructed over a period of time is provided to a neural network that is seen in FIG. 3A. The three target values that the neural network trains to determine (NED vector correction—three values for North, East, and Down corrections) are the error between the two vectors 36. Thus, there is a perceived vector (P NED), a target vector (T NED), and the error that collectively define the three targets that the neural network is to find or determine. The three target values are the difference between the P NED and the T NED 3-element vectors, found by subtraction. The neural network is trained using inputs 48 (items 34, 16, and 18), by iteratively optimizing the weight and bias values as described previously, to determine the output that best matches the three target values, the pointing error 36. The trained neural network, when given new inputs 34, 16, and 18, then calculates the difference between the P NED vector and the T NED vector value for those inputs. The error may then be used as a correction value to add it back to the T NED value vector to obtain a corrected vector that should match the actual perceived vector (P NED).

Figure 4:
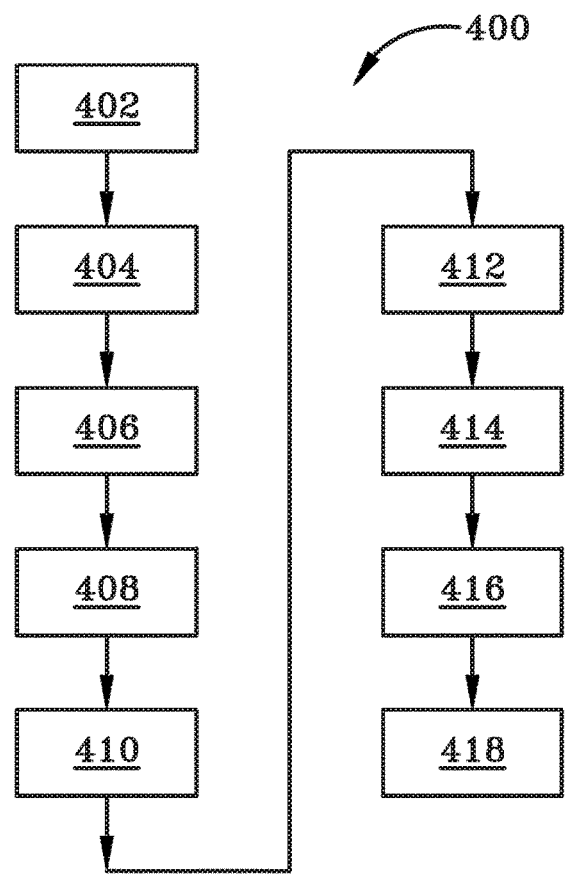
FIG. 4 is a flow chart depicting an exemplary method of training the neural network with data collected from at least one of the two terminals.

FIG. 4 depicts a flow chart for training the ANN 40. A method 400 is shown with a number of steps or processes. The method 400, according to one example is a Matlab model developed to simulate open loop pointing errors during flight operations and used to generate test datasets to train the ANN 40. The trained ANN 40 tests against other datasets from the simulation. Noise and other errors were included, in this particular example, to understand the robustness of the algorithm. The evaluation of goodness is the residual OLP error after algorithm corrections.

In one embodiment for method 400, generating a 6 degree of freedom (6DOF) dataset for an aircraft flight path position (x, y, z) and attitude (r, p, y) is shown generally at 402. In the case for the results in FIG. 4, the dataset was simulated via Matlab, however the process would be similar for real datasets. The simulation was an airborne platform flying a racetrack flight pattern with a link to a ground remote terminal. Generating NED pointing vectors from that aircraft/platform (i.e., first terminal 12) to a remote terminal (i.e., second terminal 14) is shown generally at 404. At 404, the generated NED pointing vectors to the second terminal 14 occur throughout the flight. Computing pointing vectors for the local first terminal's 12 gimbal based on the aircraft or platform attitude and gimbal Azimuth and Elevation is shown generally at 406. Computing simulated or real terminal pointing errors and adding these to the open loop pointing vector 34 to create the perceived vector 32 with errors is shown generally at 408. In this case, the error terms used are a constant vector bias term, a sinusoidal error function of gimbal Azimuth and Elevation angles, and random noise. For this simulation, randomly splitting the data into half, one-half used to train the ANN 40 and the other half used to validate test the ANN 40 accuracy is shown generally at 410. Splitting input datasets into different portions, one for training, and one for validation testing is a standard method to confirm ANN performance so that one is not testing the ANN on the same data it used for training.

In method 400, defining the ANN 40 is shown generally at 412. At 412, in defining the ANN 40, there may be one hidden layer 42 and ten neurons 44 however other amounts of hidden layers and neurons are entirely possible. With the training dataset, training the ANN with five inputs (open loop NED North, East, Down values, Azimuth and Elevation gimbal angles), and 3 target values (difference between open loop NED and perceived NED vectors) is shown generally at 414. Using the test dataset and the trained ANN 40, with the five inputs, and computing the correction for the open loop NED vector 34 is shown generally at 416. Applying this correction to the open loop NED vector 34 and comparing the results with and without the correction is shown at 418.

Thereafter, in a real application of the ANN 40, the platform carrying the first terminal 12 would then be steered or guided directly in response to the correction being applied to the pointed vector.

During method 400 plots, similar to those shown herein, may be generated to show the Azimuth & Elevation errors and a histogram of the error magnitudes for the corrected and uncorrected pointing errors. The trained ANN 40 is able to make a dramatic improvement (>10× reduction) in the terminal pointing errors. This is advantageous as the ANN has no a priori knowledge of the error function used to generate the simulated pointing errors; the only assumption is that the error has dependence on the open loop vector and the gimbal angles.

In another simulated test case having an airborne terminal 12 flying a racetrack flightpath at 40,000 ft while maintaining a link with an airborne relay second terminal 14 located 160 km (100 miles) away. After training on this data, one can see that the ANN correction results in a similar dramatic reduction (>10×) in pointing errors shown in FIG. 5A and FIG. 5B.

Figure 5A:
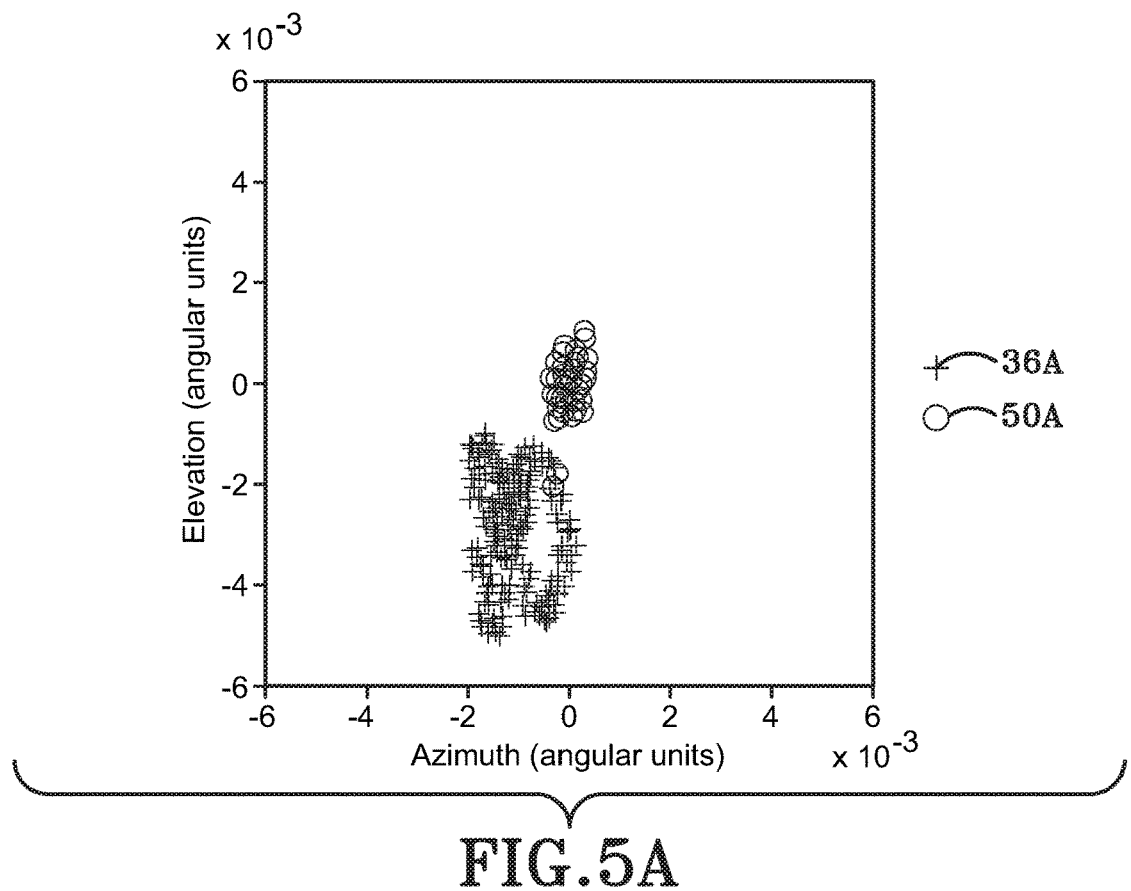
FIG. 5A is a plot of points for uncorrected and corrected pointing errors.

FIG. 5A is a plot of pointing error magnitudes for the error 36 depicting elevation (in angular units) versus azimuth (in angular units). In this simulation, the second terminal 14 is located generally at the point 0,0. However, the uncorrected errors 36A are congregated around a point averaging about −1,−3. After running the ANN 40 correction to obtain the output 50A to correct for the error, the corrected output 50A is shown as being generally centered about the point 0,0 which is the proper location of the terminal 14.

Figure 5B:
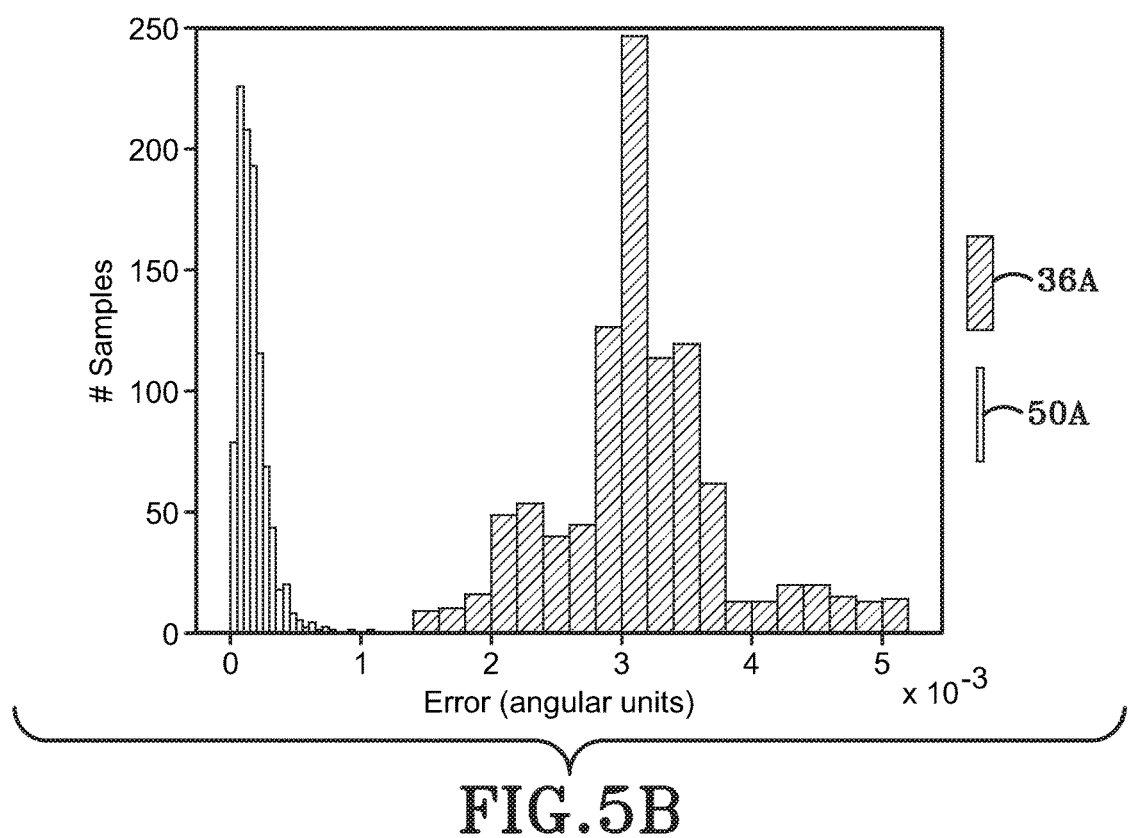
FIG. 5B is a histogram of angular error for uncorrected and corrected pointing errors.

FIG. 5B is a histogram of angular error depicting the number of samples versus the error 36 in angular units. For the plurality of uncorrected errors 36A, the mean and median are around approximately $3\times10^{-3}$. After applying the correction output from the ANN 40, the mean and median of the error 50A for the corrected signal are dramatically reduced down to about $0.25\times10^{-3}$.

In operation and as shown in the angular error plot of FIG. 5A, assuming the second terminal is located at the 0,0, when the uncorrected data shows a scatter plot of uncorrected locations based on movement and other variables of the first platform, the first terminal is calculating that the second terminal should be located in the uncorrected location. However, the system is actually observing the terminal at the 0,0. Thus, the difference between the 0,0 and the observed locations is the error in the data set that has been collected over time. After correcting the data set with the neural network, the calculated error used on the data points establishes the neural corrected prediction of the second terminal which is more focused around the actual 0,0 or the second terminal. FIG. 5B represents a histogram plot of the errors showing the data points together indicating that the error is strongly below 1 angular unit after the neural prediction.

The previous results show use cases with collected datasets on which the ANN algorithm trained with the gathered data and then generated corrections for the datasets. This use case is of value where data can be recorded as test data from the terminal, train the algorithm offline and upload the offline trained ANN for use in follow-on link sessions or missions Yet, real-time learning and pointing correction is an even more useful use case where the ANN 40 algorithm is trained in real-time while the link is active and used to predict corrections to pointing vectors live for any subsequent acquisitions during the current mission.

Figure 6:
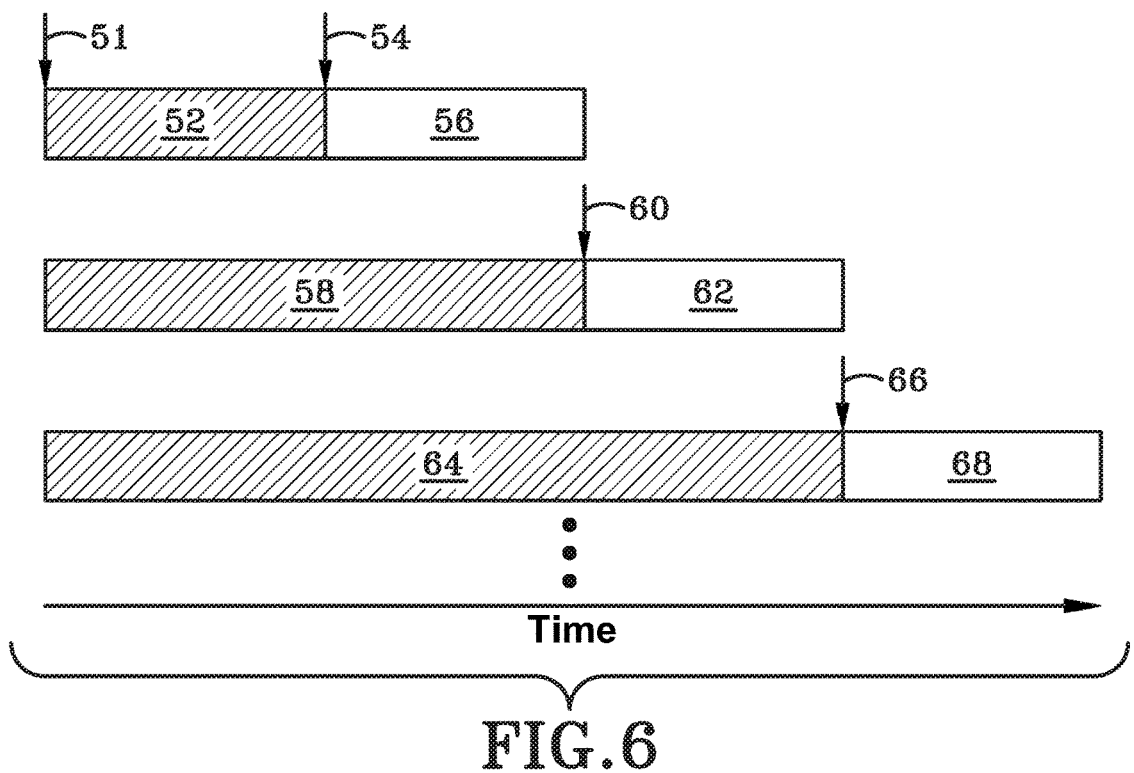
FIG. 6 is an exemplary timeline of training the neural network in real time.

FIG. 6 depicts a real-time version of the ANN 40 algorithm. At time 0, t=0, a laser communication link is established between the two terminals 12, 14 and data 52 is collected for training purposes. Then, at time 1, t=1, the ANN 40 is trained on the seed data 52, which is shown at point 54. During the time period from t=1 to t=2, which is shown at 56, the ANN 40 provides pointing corrections for acquisition in the time period 56 from t=1 to t=2.

Subsequent to the time period 56, the accumulated data from t=0 to t=2, which is shown generally at 58, is used to retrain the ANN 40 at 60. Then, during the time period from t=2 to t=3, which is shown at 62, ANN 40 provides pointing corrections for acquisition in the time period 56 from t=2 to t=3. This process continues such that subsequent to the time period 62, the accumulated data from t=0 to t=3, which is shown generally at 64, is used to retrain the ANN 40 at 66. Then, during the time period from t=3 to t=N, which is shown at 68 provides pointing corrections for acquisition in the time period 56 from t=3 to t=N.

To ensure the ANN 40 corrections are an improvement, the algorithm conditions the corrections by: Computing the Euclidean distance between the current input parameter values, 48, and the values within the training dataset, and only using the ANN correction if the distance is within a predetermined bound. E.g., do not use the ANN correction if the ANN training gimbal angles are far from our current operating point. Additionally, a weighting application of the ANN correction is based on the Euclidean distance. (I.e. the farther we are from a training point, de-weight or scale down the application of the ANN pointing correction). The process may bound the maximum magnitude of the ANN correction allowed. E.g., if the system's maximum uncorrected pointing error is <1 degree do not apply ANN corrections greater than that. In one example, the weighting application is a linear scaling factor from 0 to 1 that would be multiplied by the ANN correction (0 would apply no correction, 1 would apply the full correction). The scaling factor would be determined by the ratio between the Euclidean distance and a predetermined scale parameter value. E.g. if the scale parameter is 1 degree, and we are 0.5 degree from the nearest training datapoint we would apply 0.5/1 or 50% of the calculated correction value.

Figure 7:
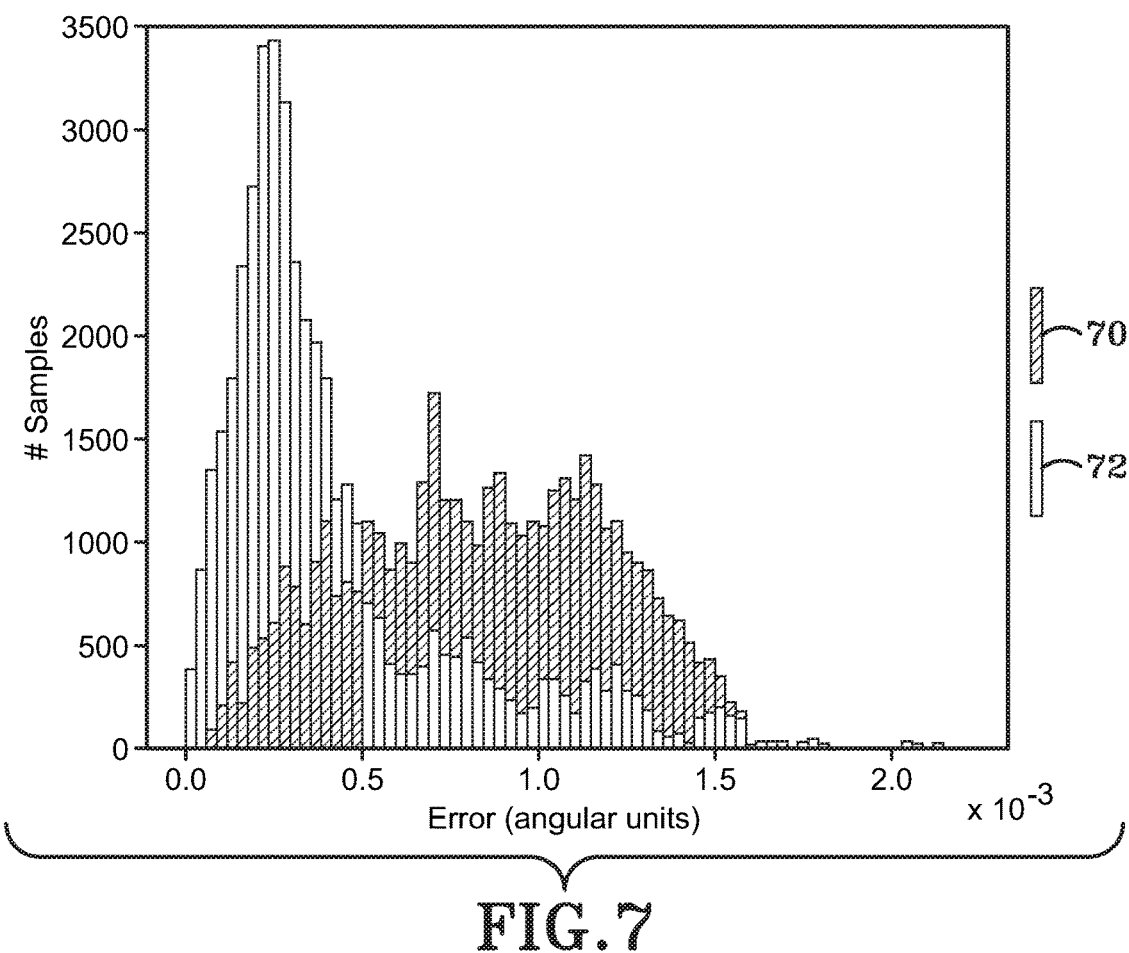
FIG. 7 is an exemplary histogram of corrected results and uncorrected results of training the neural network in real time.

While the link is active, continue accumulating data for training updates Periodically, in predetermined time increments retrain the ANN on the larger accumulated dataset. We retain the ANN's weights between training sessions as new data accumulates in the training set to minimize computation times FIG. 7 is a histogram of angular error for the number of samples versus pointing error (in angular units) that depicts the preliminary results using this real-time learning method, indicating significant error correction capability. The uncorrected errors are shown at 70 and the corrected errors are shown at 72. As shown, training on a portion of the data and projecting corrections forward into untrained space is not as good as the cases where the training and test datasets highly overlap. Of note here is that this dataset used aggressively challenges the ANN 40 algorithm since it continuously covers new areas of the terminal's 12 field of regard, never repeating. Therefore, each new increment of input data is new unexplored territory, on which the ANN 40 has not trained. In a more realistic operational scenario, the input data tends to overlap with repeating nearby points, which favors the trained ANN 40.

Some of this uncorrected errors 70 in the ANN result is the initialization process where no pointing correction is available while the algorithm fills the initial seed dataset. For this case, it may be advantageous to use the first tenth of the dataset as a seed and so 10% of the points are uncorrected.

One can also see in the FIG. 7 a very small number of outlier points where the ANN solution increased the pointing error. This indicates better conditioning of the output maybe necessary to filter these out. Further optimization of learning increments, output conditioning, and examination of other more realistic test cases will yield significant improvement over the results shown in FIG. 7.

In accordance with one aspect of the present disclosure, if the link between the two terminals goes down, then the neural network correction is used to establish the link between the two terminals faster than what was previously known. This is beneficial in situations where the link between the two terminals is commonly lost and needs to be reacquired.

In accordance with another aspect of the present disclosure, the system is used for an extended period of time and is determined that the errors are prevalent, during an acquisition sequence that takes some time, such as about 30 seconds to uplink and locate the other terminal, the neural network data from previous sessions can create a correction that is used during a subsequent uplink session for initial acquisition reduce the initial acquisition time from about 30 seconds to almost instantaneously. Thus, the neural network is able to account for the initial errors in the system to establish a method for correcting the initial pointing errors in subsequent acquisitions at a reduced amount of time. In accordance with one aspect of the present disclosure, the training of the neural network may be accomplished in a number of different ways. However, in accordance with one particular embodiment, some pre-processing needs to be accounted for to accomplish desired neural network training techniques. For example, in a situation where the Azimuth is being accounted for, pre-processing techniques must be input to identify that the Azimuth angle may be any angle between 0° and 360°. However, 0° and 360° are the same. Based on this, there may be a data set that includes multiple Azimuth angles that make a complete revolution of the exemplary Azimuth angle loop. As such, there may be some discontinuity as angles jump from near 360° back down to 0°. One exemplary solution to overcome this computer centric problem, here the mathematical discontinuity is to input the sign of the Azimuth angle and the co-sign of the Azimuth angle rather than the Azimuth angles themselves. By inputting the sine of the Azimuth angle and the cosine of the Azimuth angle, preprocessing is able to provide a more continuous function to the neural network for proper training. In another particular embodiment, a preprocessing technique that provides for more efficient and robust neural network training is to, instead of providing the Azimuth angle, inputting the Azimuth angle and the Elevation angle and provide them converted as vectors to the neural network for more efficient and proper training to remove the discontinuities. A similar discontinuity problem exists for Elevation angles and the same techniques of applying the sine angle of the Elevation angle and the cosine of the Elevation angle, or the Elevation angle as a vector to reduce discontinuity as the Elevation angle transitions from near 360° to 0°.

The ANN 40 may be conditioned so that it does not exceed the original pointing, uncertainty or error. In this scenario, data set is gathered after an operating session. This data set may be used to calculate, either offline or online, a neural network correction. In a later session, the correction may be used and applied to a new session to provide a corrected pointing vector. There may be some instances where the neural network correction may not be perfect. This may refer to a situation where the neural network correction exceeds a predefined threshold limit, which would actually decrease the efficiency of the neural network on the data set during the live or online session. Thus, the neural network solution may be limited to only apply to errors below a certain threshold level. For example, the threshold could be a certain degree such that the neural network only applies to pointing errors that are less than 1°. However, other predefined thresholds of the neural network may be implemented.

Another conditioning mechanism that may be applied is to place a test on the operating conditions that are used as input values as to how far the input conditions are from the variables that are used to create the neural network. For example, if the second terminal is in the air flying around and makes a complete 360° loop around the first terminal, then this would provide a robust data set for all scenarios in which the second terminal may be trained for. However, if the training was only on a limited number of Azimuth angles that did not make a complete 360° loop around the first terminal, then there may be a limited number of Azimuth data sets to train on, in which case the conditioning may limit the data set to only adjust the operating inputs within a certain range of the original testing data points.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The term "Euclidean" refers to a Euclidean vector space is a finite-dimensional inner product space over the real numbers. A Euclidean space is an affine space over the reals such that the associated vector space is a Euclidean vector space. Euclidean spaces are sometimes called Euclidean spaces for distinguishing them from Euclidean vector spaces. The dimension of a Euclidean space is the dimension of its associated vector space. If E is a Euclidean space, its associated vector space is also called its space of translations, and often denoted $\vec{E}$. The elements of E are called points and are commonly denoted by capital letters. The elements of $\vec{E}$ are called translations. The action of a translation v on a point P provides a point that is denoted P+v. This action satisfies P+(v+w)=(P+v)+w. (The second+ in the left-hand side is a vector addition; all other+denote an action of a vector on a point. This notation is definite, as, for distinguishing between the two meanings of +, it suffices to look on the nature of its left argument.) The fact that the action is free and transitive means that for every pair of points (P, Q there is exactly one vector v such that P+v=Q. This vector v is denoted Q−P or $\overrightarrow{PQ}$.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method comprising:
   training an artificial neural network (ANN) with training data characterizing pointing error between a first terminal and a second terminal remote from the first terminal, and input data including parameters, wherein completion of the training provides a trained ANN;
   inputting first terminal data with dependent data having an unknown pointing error to the trained ANN;
   correcting the first terminal data with the trained ANN to reduce pointing uncertainty between the first terminal and the second terminal; and pointing the first terminal at the second terminal based on corrections to pointing error between the first and second terminals.

2. The method of claim 1, wherein correcting the first terminal data with the trained ANN includes:
computing a distance between a first input parameter within the first terminal data and an input parameter within the training data.

3. The method of claim 2, wherein the distance that is computed is a Euclidean distances.

4. The method of claim 2, further comprising:
determining whether the distance that is computed is within a predetermined bound;
wherein if the distance is within the predetermined bound, then correcting the first input parameter, and if the distance is outside the predetermined bound, then no correction of the first input parameter occurs.

5. The method of claim 4, wherein the first input parameter is a gimbal angle of the first terminal, further comprising:
bounding a predetermined range for gimbal angles between the first terminal and the second terminal;
computing a Euclidean distance between the gimbal angle at the first terminal and a training gimbal angle of the training data;
correcting the gimbal angle of the first terminal relative to the second terminal when the gimbal angle of the first terminal is within the predetermined bound, and if the gimbal angle of the first terminal is outside the predetermined bound, then no correction occurs.

6. The method of claim 2, further comprising:
weighting an application of a correction of the first terminal data based on the distance between the between the first input parameter within the first terminal data and the input parameter within the training data,
wherein smaller distances between the first input parameter within the first terminal data and an input parameter within the training data are weighted more than greater distances between the first input parameter within the first terminal data and the input parameter within the training data.

7. The method of claim 6, further comprising:
weighting the Euclidean distance between the first input parameter within the first terminal data and the input parameter within the training data.

8. The method of claim 6, further comprising:
bounding a maximum magnitude of a permitted ANN correction prior to weighting the application of the correction.

9. The method of claim 8, wherein the maximum magnitude of the distance between the first input parameter within the first terminal data and the input parameter within the training data for the permitted ANN correction is less than one degree.

10. The method of claim 9, further comprising:
weighting corrections having the distance between the first input parameter within the first terminal data and the input parameter within the training data closer to zero degrees more than corrections having the distance between the first input parameter within the first terminal data and the input parameter within the training data closer to one degree.

11. The method of claim 2, further comprising:
receiving signal data from the second terminal in the first terminal; and
calculating a perceived vector between the first terminal and the second terminal, wherein the perceived vector is part of the first terminal data that is corrected with the trained ANN;
wherein the distance to be computed is the distance between the perceived vector and a training vector within the training data.

12. The method of claim 11, wherein receiving signal data from the second terminal in the first terminal is accomplished by:
acquiring signal data from the second terminal; and
tracking the second terminal relative to the first terminal.

13. The method of claim 11, further comprising:
assessing a pointing error by comparing the perceived vector with an open-loop pointing vector between the first terminal and the second terminal.

14. The method of claim 13, further comprising:
computing the perceived vector from the first terminal to the second terminal based, at least in part, on a position of a beam steering mirror in the first terminal.

15. The method of claim 14, further comprising:
computing a gimbal vector based, at least in part, on gimbal angles associated with the beam steering mirror in the first terminal; and
rotating the gimbal vector into a reference frame using a transpose of a direction cosine matrix of the first terminal.

16. The method of claim 13, inputting first terminal data with dependent data having an unknown pointing error to the trained ANN is accomplished by:
inputting open-loop vector data from the first terminal and gimbal angles of the first terminal into the trained ANN.

17. A non-transitory computer readable storage medium having instructions encoded thereon that, when executed by one or more processor, implements operations to correct pointing errors between two terminals, the instructions to implement the operations comprising:
train an artificial neural network (ANN) with training data characterizing pointing error between a first terminal and a second terminal remote from the first terminal, and the input data including parameters, wherein completion of the training provides a trained ANN;
input first terminal data with dependent data having an unknown pointing error to the trained ANN;
correct the first terminal data with the trained ANN to reduce pointing uncertainty between the first terminal and the second terminal; and
point the first terminal at the second terminal based on the correcting performed by the trained ANN.

* * * * *